Aug. 11, 1959  R. M. WISEMAN  2,899,042

COUPLING MEANS FOR SCREW CONVEYOR

Filed June 3, 1957

INVENTOR
RUSSELL M. WISEMAN

BY Warburton & Cross

ATTORNEYS

United States Patent Office 2,899,042
Patented Aug. 11, 1959

2,899,042

COUPLING MEANS FOR SCREW CONVEYOR

Russell M. Wiseman, Mentor, Ohio, assignor to Diamond Alkali Company, Cleveland, Ohio, a corporation of Delaware Application June 3, 1957, Serial No. 663,266

4 Claims. (Cl. 198—213)

This invention relates to a new and improved screw conveyor and more particularly relates to a new and improved coupling for adjoining flights of a screw conveyor.

Screw conveyor flights are manufactured in conventional lengths as is well known since above a certain length inefficiencies in manufacture and operation occur. Accordingly, when a conveyor comprising more than one standard length is required, it is necessary operatively to connect two or more flights. A screw conveyor flight normally comprises a hollow shaft or tube upon which the screw is mounted and supported. A screw conveyor also includes a shell or cover surrounding the screw structure to retain the material being conveyed.

Despite the advantages inherent in screw conveyors and their operation, certain difficulties have heretofore been encountered with respect to the flight couplings employed between adjoining flights. One prior art means of connecting adjacent flight segments comprised inserting a solid shaft into the ends of the adjoining hollow tubes and relying upon the inserted solid as a journal for supporting the conveyor, e.g., via a suspended hanger bearing. However, as such a connector shaft tends to wear during use, from time to time it would have to be removed and replaced. Since such connector shafts were inserted into the ends of adjoining conveyor flight hollow shafts, replacement thereof was difficult typically involving almost complete dismantling of the structure.

Other prior proposals for connecting adjoining conveyor flight segments involve the use of couplings keyed to mating solid shanks pressed into the ends of adjoining conveyor flight hollow shafts. However, while avoiding certain of the disadvantages of the other prior proposals, such devices involve the difficulty that the conveyor flight shafts are secured to the keyed shanks only by frictional engagement and that there is no positive means to prevent slippage under high load with the result that transmission of power from one conveyor flight to another may be impaired.

Other prior means of connecting the adjoining flights contemplated by the prior art involve the use of other types of plug-type inserts disposed within the adjoining ends of the hollow conveyor flight shafts including solid plugs engaged in the ends of such shafts by transverse bolts therethrough. While such means avoid certain of the difficulties of the aforementioned prior art, these devices often are not readily removable or adjustable within the shaft. It will be appreciated, of course, that in the use of screw conveyors in corrosive atmospheres where increased maintenance often is essential, the corrosive conditions encountered tend to render difficult replacement of such parts.

Another prior screw conveyor flight coupling involves the use of transversely-disposed bolts extending through cylindrical couplings enclosing both ends of adjoining hollow shafts. Again, one is confronted with the difficulty that to replace or adjust such shafts, considerable longitudinal motion of the conveyor shafts is necessary to disengage the coupling, which longitudinal motion frequently is not possible to achieve without difficulty.

Accordingly, it is the principal object of the present invention to avoid the difficulties heretofore encountered in connecting adjoining screw conveyor flights and to provide a new and improved coupling therefor.

A further object of the invention is to provide coupling means for insuring proper alignment of adjoining screw conveyor flights.

A still further object of the invention is to provide a new and improved screw conveyor flight coupling and support.

These and other objects and advantages of the invention will appear more fully from the following description thereof.

The present invention comprises a screw conveyor assembly including two shafts, although not necessarily generally hollow, supporting adjoining conveyor flights aligned end to end along a common longitudinal axis wherein there is provided an improved conveyor flight coupling comprising, in combination, outwardly extending annular shaft flanges on, and extending, with the curved screw surface, beyond adjoining ends of such shafts, a spool disposed between and secured to such shaft flanges via corresponding flanges thereon and short axial cylindrical extensions on the ends of the spool which abut corresponding inner cylindrical shoulders on the shaft flanges and a journal bearing operatively disposed about a cylindrical journal surface of reduced diameter on said spool between said spool flanges. The spool and flight couplings are joined by a plurality of bolts disposed in axially-extending holes in said flanges spaced around the circumference of said flanges.

A preferred embodiment of the invention comprises a spool of the above type wherein a hardened journal surface is provided, the surface either comprising a superimposed journal surface of hardened material such as Stellite (cobalt-chromium-tungsten alloy) or Studite (cobalt-chromium-tungsten alloy), typically in a thickness of about ⅛ inch, or a surface hardened zone formed on the spool itself. Preferably, the journal surface has a Rockwell "C" hardness of 45° to 60°, e.g., ⅛ inch Stellite 6–K having a Rockwell "C" value of 46° to 49°.

Referring now to the accompanying drawing.

Figure 1:
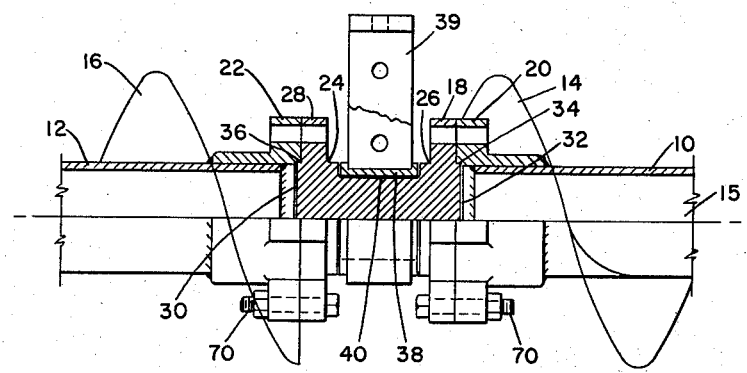
Fig. 1 illustrates, partially in section, a screw conveyor assembly of this invention.

Referring more particularly to the drawing, it will be appreciated that in Fig. 1 there is shown a screw conveyor including two hollow shafts 10 and 12 supporting adjoining conveyor flights 14 and 16 aligned axially about a common longitudinal axis 15. There is provided a conveyor flight coupling or spool indicated at 18 comprising, in combination, outwardly extending annular shaft flanges 20 and 22 which are welded to, and extend beyond as do the flights 14 and 16, adjoining ends of said shafts 10 and 12. Spool 18 is disposed between, and secured to, the shaft flanges 20 and 22 by corresponding spool flanges 26 and 28 by bolts 70 extending through axially-drilled aligned holes in the flanges and cylindrical extensions 30 and 32 on the ends of the spool abutting inner cylindrical shoulders 34 and 36 on the shaft flanges 20 and 22. There is provided a journal bearing 38 preferably having a Rockwell "C" hardness less than that of the journal surface, e.g., a Rockwell "C" hardness within the range from 40° to 50° as exemplified by Stellite 6-B having a Rockwell "C" value of 42° to 45°, operatively disposed about a cylindrical journal surface 40 of reduced diameter on said spool between said spool flanges. The journal bearing 38 is supported by a bearing hanger 39 adapted to be secured to conventional overhead support means (not shown).

Figure 2:
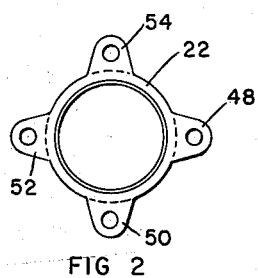
Fig. 2 is a plan end view of a shaft flange in accordance with this invention.
Figure 4:
Fig. 4 is an elevational view of the flange shown in Fig. 2.

As shown in more detail in Figs. 2 and 4, shaft flange 22, identical to flange 20, comprises a cylindrical element 46 of an inner diameter to fit over the end of shaft 12. Flange 22 also is provided with a plurality of radially-extending flanges or projections 48, 50, 52 and 54, each provided with an axially-drilled opening to receive a bolt 70 projecting through a corresponding opening in spool flange 28.

Figure 3:
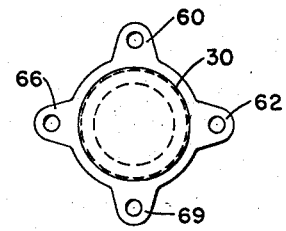
Fig. 3 is a plan view of the connector spool in accordance with this invention.
Figure 5:
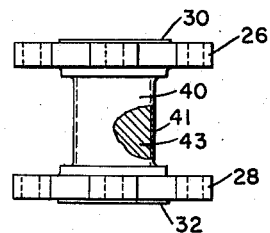
Fig. 5 is an elevational view, partially in section, of the spool shown in Fig. 3.

Spool flange 28, shown in more detail in Figs. 3 and 5, comprises, on a reduced diameter portion, between the spool flanges 26 and 28 a journal surface 40 which, as indicated in Fig. 5, partially in section, preferably comprises an outer hardened wear layer 41 integrally bonded to the spool shaft 43. Provided at each end of the spool are short cylindrical axial extensions 30 and 32 adapted to snap into shaft flanges 20 and 22. As best shown in Fig. 3, the spool flanges are provided with a plurality of radial extensions 60, 62, 66 and 69, having axially-drilled openings therein to receive bolts 70 as shown in Fig. 1 when aligned with corresponding openings in the extensions 48, 50, 52 and 54 on the shaft flange 22.

It will be observed that in apparatus of this invention all of the adjustable parts and adjusting means are external of the conveyor flight shaft thereby facilitating access during maintenance and precluding entirely any difficulties encountered by internal corrosion of the shaft. Moreover, longitudinal extensions 30 and 32 on the spool 28 by snapping into internal shoulders 34 and 36 on the shaft flanges facilitate inspection and replacement of the journal spool and alignment of the shaft. It will further be appreciated that should wear occur at such points, the shaft flanges themselves can readily be replaced.

It is to be understood that although the invention has been described with specific reference to particular embodiments thereof, it is not to be so limited, since changes and alterations therein may be made which are within the full intended scope of this invention as defined in the appended claims.

What is claimed is:

1. In a screw conveyor including a plurality of axially-aligned conveyor flights, an improved coupling means for the conveyor flights comprising outwardly extending flanges on the ends of the shafts of said flights, which flanges project axially as well as outwardly beyond said shafts, forming a shallow inner shoulder in said flanges, a solid spool-shaped coupling member disposed between the flanges of two of said shafts so as to be rotatable with said shafts, said member having outwardly extending flanges on each end thereof, said flanges corresponding to the flanges on the flight shafts, the area between said flanges on the spool being formed into a hardened bearing surface, said spool member having an axially extending portion on each end thereof, said portion fitting in aligning relationship into the shallow inner shoulder formed by the axially extending portion of the flanges on said flight shafts, and means for immovably securing the flanges on said flight shafts to the flanges on said coupling member.

2. A screw conveyor flight coupling as in claim 1 wherein the conveyor flights extend beyond the ends of the hollow conveyor flight shafts.

3. The flight coupling as claimed in claim 1 wherein the means for removably securing the flanges on the flange shaft to the flanges on the coupling member are a plurality of bolts extending through aligned openings in said flanges.

4. A flight coupling as claimed in claim 1 wherein the hardened bearing surface between the flanges of the spool member is a bonded hardened bearing surface of a material differing from that of the spool member itself.

References Cited in the file of this patent

UNITED STATES PATENTS

| 376,900 | Morrell | Jan. 24, 1888 |
| 2,751,203 | Compton | June 19, 1956 |

FOREIGN PATENTS

| 104,275 | Australia | June 16, 1938 |
| 197,800 | Germany | Apr. 28, 1908 |